Aug. 13, 1963
R. J. HULL
3,100,697
APPARATUS FOR TREATMENT OF NATURAL GAS
Filed Aug. 1, 1960
2 Sheets-Sheet 1
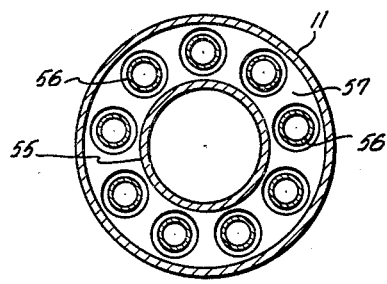
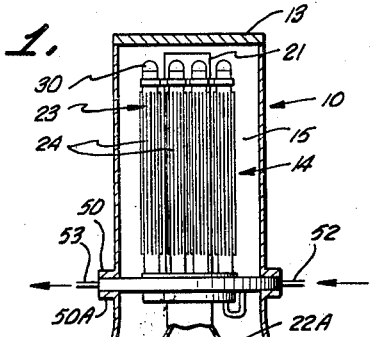
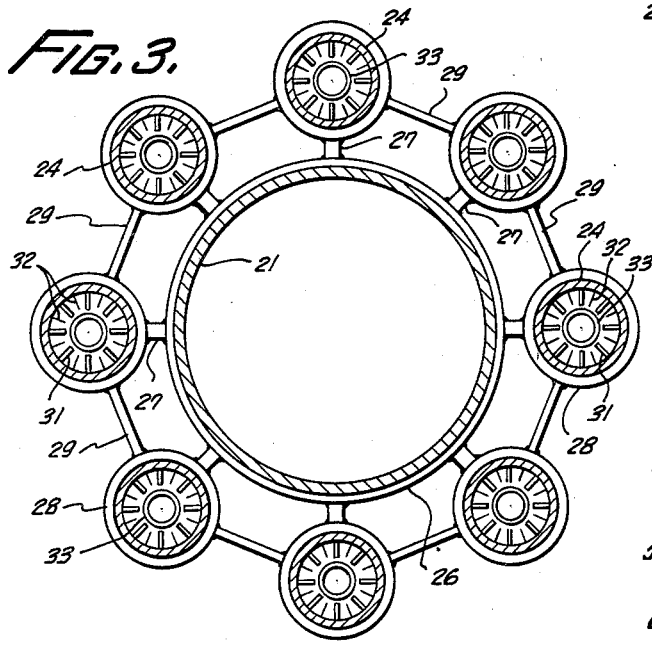
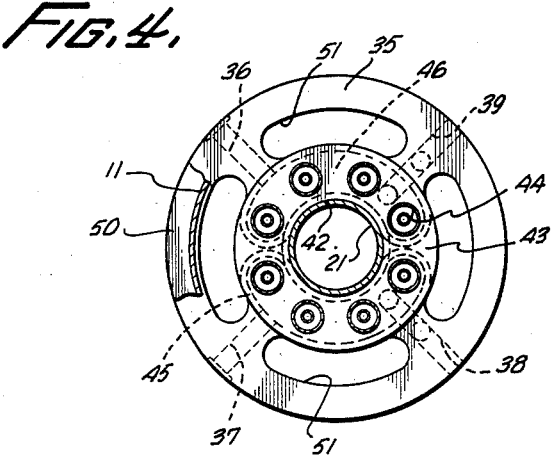
INVENTOR.
RAYMOND JAMES HULL
BY
Christie, Parker & Hale
ATTORNEYS

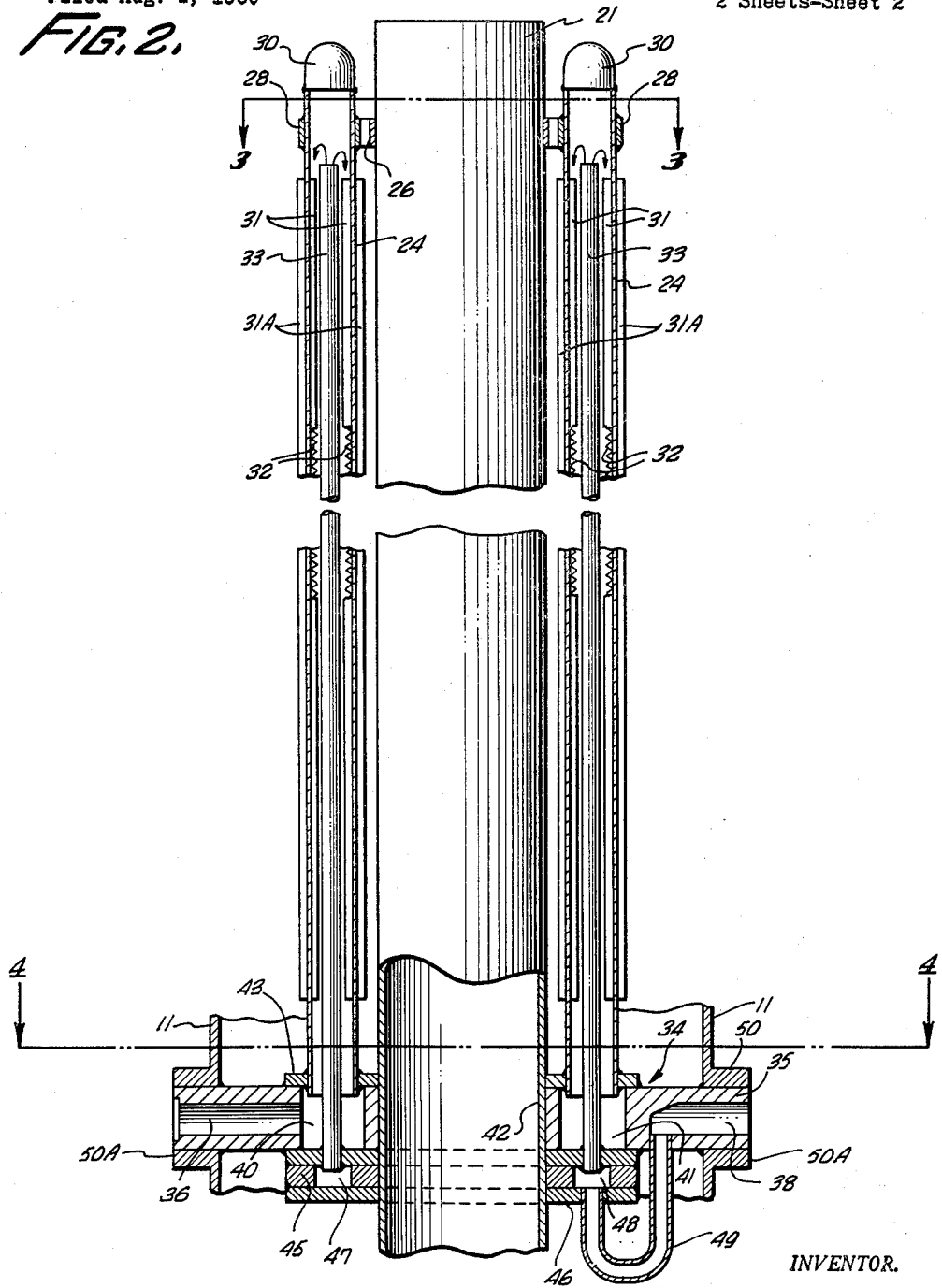

United States Patent Office 3,100,697
Patented Aug. 13, 1963

3,100,697
APPARATUS FOR TREATMENT OF
NATURAL GAS
Raymond James Hull, Orange, Calif., assignor to Gas
Processing Inc., Fullerton, Calif., a corporation of
California
Filed Aug. 1, 1960, Ser. No. 46,816
5 Claims. (Cl. 62—42)

This invention relates to natural gas treatment and particularly to a refrigerating unit for use in a treating apparatus in which water and condensable hydrocarbons are removed from natural gas.

The term "natural gas" refers to the gaseous mixture of hydrocarbon compounds produced from subterranean reservoirs. Such gas, particularly when found underground in association with oil, contains relatively large amounts of hydrocarbon constituents higher in molecular weight than propane and, in such state, is called wet natural gas. The wet gas may be processed to yield two products, one being "casinghead gas" or "natural gasoline," a liquid product composed of the more readily condensable hydrocarbons in the wet gas, and the other being dry natural gas. In addition, natural gas, as obtained at the well-head of a producing well, frequently contains condensable water.

The presence of condensable constituents in natural gas as it is produced requires that the gas be treated before it is placed in gas transmission systems. Otherwise, condensation of liquids occurs within pipelines with a consequent adverse effect on operations of the transmission system. In addition, the presence of both condensable hydrocarbons and water can result in the formation of gas hydrates within the pipeline with resultant reduction in the flow capacity of the transmission system. Further, natural gasoline is itself a valuable product so that its removal prior to sale of the natural gas is of economic benefit to the producer.

The process for treating natural gas generally used in conventional treating plants may be classified either as an absorption process or as a low-temperature recovery process.

The absorption process is particularly used in large capacity installations. After compression and cooling of the wet natural gas to condenser water temperature, hydrocarbon constituents are removed from the natural gas by a suitable absorption solvent. Removal of water from the gas requires the use of dehydrating agents such as the glycols.

The low-temperature recovery process, while better adapted for small capacity installations, involves compression of the gas followed by cooling to low-temperatures and, generally, simultaneous treatment with dehydrating agents. A regenerative cycle to recover the dehydrating agent must be included as part of such a process.

The expense of conventional gas treating plants causes many instances to arise where natural gas is wasted by venting to the atmosphere or it is not produced because the installation of a treating plant cannot be economically justified. This particularly occurs where the discovered gas reservoir is small in size, or its location is remote or the true capacity of the reservoir has not been sufficiently defined to show an economic balance in favor of a treating plant. Even though gas transmission facilities are available, the untreated natural gas cannot therefore be marketed.

A need exists for processing equipment designed so that the maximum number of treating steps are carried out in a single unit. In this manner, it would be possible not only to reduce the cost of gas treating equipment but to make such equipment semi-portable. Treating of natural gas could then be done under circumstances which preclude installation of large conventional gas treating plants.

In my copending application, Serial No. 701,581, filed December 9, 1957, now Patent No. 2,964,915, I disclosed an apparatus for the treatment of natural gas to remove the condensable hydrocarbons and water from the gas. The refrigerating rectifier disclosed therein comprises an elongated vertical shell closed at its longitudinal ends to form a fluid-tight enclosure. A feed gas inlet is provided so that wet feed gas can flow into the enclosure. A first tubular heat-exchanging means is provided within the enclosure to pre-cool the feed gas and thereby to remove by condensation a part of the condensable hydrocarbons and water in the wet gas. A second tubular heat-exchanging means is also provided within the enclosure above the first heat-exchanging means and is adapted to receive interiorly a refrigerating fluid. The second heat exchanging means further cools the feed gas and thereby removes additional condensable hydrocarbons and water from the gas. Means are provided for directing feed gas upwardly across the exteriors of the first and second heat exchanging means successively. The gas passing across the second heat exchanging means is then directed into the interior of one end of the first heat exchanging means. The liquids condensed as a result of the gas passing across the second heat exchanging means are directed downwardly in counter-current heat transfer relationship with the feed gas. A gas outlet is provided in communication with the interior of the first heat exchanging means. A liquid outlet is provided in the lower part of the enclosure.

The passage of wet natural gas through the refrigerating rectifier of the invention described in my copending application removes both water and condensable hydrocarbons from the wet gas so that a dry natural gas, suitable for pipeline transmission, is produced. Furthermore, the hydrocarbons, condensed from the wet gas, are fractionated and stripped of some of the light, high vapor-pressure components, namely, methane, ethane, and propane, within the rectifier by utilizing the heat of the incoming feed gas. The liquid hydrocarbon product thus obtained may thereupon be further stabilized, if desired, by treatment in a stabilizing column.

The apparatus of the invention described in my above-described copending application possesses the advantages of economy and compactness. Even when the refrigerating rectifier is operated in conjunction with a stabilizing column, the cost for the natural gas treatment is considerably less than the cost of a conventional natural gas treating plant employing either the absorption process or the low-temperature recovery process. For example, as compared to the conventional low-temperature recovery process, approximately three-fifths as much refrigeration is required in the apparatus of the invention per gallon of hydrocarbon product recovered. These factors of economy and compactness permit utilization of the apparatus under circumstances and in locations where installation of a conventional gas treating plant would not be economically feasible.

I have now discovered that the over-all economy and effectiveness of the refrigerating rectifier described in my copending application are markedly improved through the utilization of the refrigerating unit of my present invention as the second heat exchanging means. The refrigerating unit of my present invention includes a first plurality of vertical tubes spaced around the means for directing gas into the interior of the first heat exchanging means. A second equal plurality of vertical tubes is arranged so that each of the tubes of the second plurality is disposed concentrically within a tube of the first plurality. An intake header includes a chamber which is in flow communication with one end of one plurality of tubes. Means are provided to connect the chamber of the intake header and a source of refrigerating fluid. A discharge header includes a chamber which is in flow communication with a like end of the other plurality of tubes. Means are provided for removing refrigerating fluid from the discharge header.

The refrigerating unit of my present invention possesses the advantage that it provides a maximum heat transfer surface so that the effectiveness of a given refrigerating capacity in cooling natural gas is markedly increased. The structure of the refrigerating unit is such that the pressure drop between the point of first evaporation of the refrigerating fluid and the point of last evaporation of the refrigerating fluid is negligible. As a result, the full potential of the entire temperature differential between the refrigerating fluid and the natural gas is realized. The refrigerating unit of my invention is adapted so that, by reversal of connections, the refrigerating fluid in indirect heat transfer relationship with the natural gas may be flowing either downwardly or upwardly within the unit. Furthermore, the structure of the refrigerating unit enables the use of aluminum, thereby accruing the advantages of the corrosion resistance and high heat transfer efficiency of that material. This is achieved in a steel vessel system without the use of packing joints or brazing between aluminum and steel.

The refrigerating unit of my invention and its manner of operation, as well as its advantages, will be more clearly understood from the following description made in conjunction with the accompanying drawings in which:

FIG. 1 is a sectional elevation of a refrigerating rectifier including the refrigerating unit of my invention;

FIG. 2 is an enlarged fragmentary elevational view, partially sectioned, showing the refrigerating unit of my invention in greater detail;

FIG. 3 is a section taken along line 3—3 of FIG. 2;

FIG. 4 is a section taken along line 4—4 of FIG. 2; and

FIG. 5 is a section taken along line 5—5 of FIG. 1.

With reference to FIG. 1, a refrigerating rectifier 10 comprises an elongate vertical outer shell 11 formed through the use of pipe of suitable diameter. The outer shell is conveniently assembled in three sections, the sections being joined together by flanges to produce a column approximately 44 feet in height. A lower internal cap 12 joined to the inside wall of the shell near the bottom of the rectifier, an upper external cap 13 joined to the top of the rectifier and the shell define a fluid-tight enclosure 14 extending substantially the entire length of the rectifier.

For descriptive purposes, it is convenient to consider the enclosure as subdivided into four sections, which are designated as a refrigerating section 15, a pre-cooling section 16, a gas outlet section 17, and a liquid-collecting section 18.

The refrigerating section is bounded at its upper longitudinal end by the upper external cap of the rectifier and at its lower longitudinal end by a gas distribution header 19. The gas distribution header is a doughnut-shaped member with a hollow interior. Its outside diameter is less than the inside diameter of the shell. An annular space for the passage of fluids is defined between the outer wall of the header and the inner wall of the shell. To avoid excessive pressure drops and cooling of the flowing gas as occurs during flow through small orifice areas, the shell in the preferred embodiment is belled outwardly to provide an adequate cross-sectional area for the flow of fluids. The upper side of the gas distribution header can be downwardly inclined toward the hole of the doughnut to improve liquid drainage. A strip 20 is joined to the periphery of the header on the upper side to facilitate collection of liquid condensate.

A gas downcomer 21 is disposed coaxially with the shell and centrally within the refrigerating section. The gas downcomer is a pipe open at the top and capped at the bottom and has an outside diameter substantially less than the inside diameter of the shell. The gas downcomer is supported by three tubes 22, 22A, and 22B, the latter not being shown, extending laterally and downwardly from near the bottom of the downcomer to the top of the gas distribution header. The tubes provide means for flow of fluids from the interior of the downcomer into the interior of the gas distribution header.

The refrigerating unit of my invention, generally identified by reference character 23, is positioned in the annular space formed between the outer wall of gas downcomer 21 and the inner wall of the outer shell 11, as particularly shown in FIG. 1. A first plurality of outer heat exchanger tubes 24 is vertically disposed in a central position within the annular space, the tubes being spaced evenly, one from the other. In the embodiment of the refrigerating unit shown, eight aluminum tubes are utilized. The structure of refrigerating unit 23 is shown in detail in FIGS. 2 to 4. The upper ends of tubes 24 are supported by a stabilizing structure 25. The stabilizing structure includes a stabilizing ring 26 slidably fitted over the gas downcomer. A plurality of radial struts 27 project outwardly from the stabilizing ring. Each radial strut supports a tube support ring 28 at its outermost end. Each tube support ring closely fits around an outer heat exchanger tube and is rigidly joined to the tube as by brazing so as to provide support for the upper end of the tube. Lateral braces 29 interconnect the tube support rings.

The upper end of each of the outer heat exchanger tubes is closed by a cap 30. A plurality of spaced-apart radial fins 31, extending over a substantial portion of the longitudinal length of the tube, project inwardly from the inner wall of each tube. A plurality of spaced-apart radial outer fins 31A having a length substantially equal to the length of the inner fins project outwardly from the outer wall of each outer tube. To promote turbulence in the flow of the refrigerating fluid and to reduce the net cross-sectional area available to flow of the fluid, a wire 32 having off-set bends of approximately one-half inch is inserted in the areas formed between each two fins within each tube 24 and extends longitudinally to substantially the same extent as the fins.

The inward projection of fins 31 within tubes 24 is adapted to leave a central space within each tube. Each of a second plurality of inner heat exchanger tubes 33 is positioned vertically and concentrically in the central space within each tube 24.

The lower ends of tubes 24 and of tubes 33 are supported in a fluid distribution header generally identified by reference character 34 and particularly shown in FIG. 2. The distribution header includes a central plate 35 having a diameter greater than the outer diameter of shell 11, for reasons to be described more particularly below. Central plate 35 includes a first pair of radial flow passages 36, 37, indicated by broken lines in FIG. 4; a second pair of radial flow passages 38, 39, indicated by broken lines in FIG. 4; a pair of annular chambers 40, 41; and a central bore 42 through which gas downcomer 21 passes. Radial flow passages 36, 37 terminate in annular chambers 40, 41, respectively, and provide flow communication therewith.

A tube plate 43, having a diameter substantially less than the diameter of central plate 35, is centrally joined as by brazing to the upper side of the central plate and forms the top of chambers 40 and 41. The tube plate includes a plurality of bores 44 through which outer tubes 24 are fitted. Each outer tube is rigidly joined to the tube plate as by brazing at the point where the tube passes through the bore in the tube plate. The lower ends of four outer tubes depend into chamber 40 so that their interiors are in flow communication with the chamber; the lower ends of the four remaining outer tubes depend into chamber 41 so that their interiors are in flow communication with the chamber.

Lower headers 45, 46 are arcuate in shape and are joined to the lower side of the central plate on opposite sides of gas downcomer 21, as particularly indicated by broken lines in FIG. 4. Each lower header is formed by three arcuate sheets joined together and adapted to form chamber 47 in header 45 and chamber 48 in header 46. The lower ends of the four inner heat exchanger tubes concentrically disposed within the outer tubes that depend into chamber 40 pass through chamber 40 and through bores in the upper sheet of lower header 45 so as to depend into chamber 47. The lower ends of the four inner heat exchanger tubes concentrically disposed within the outer tubes that depend into chamber 41 pass through chamber 41 and through bores in the upper sheet of lower header 46 so as to depend into chamber 48. A U-shaped conduit 49 interconnects radial flow passage 38 and chamber 48. A similar U-shaped conduit (not shown) interconnects radial flow passage 39 and chamber 47.

The portion of central plate 35 projecting beyond the outer shell is supported, as by bolts (not shown), between a pair of annular flanges 50, 50A joined to the outer wall of outer shell 11, as particularly shown in FIGS. 1 and 2. A plurality of flow passages 51 in the central plate outward of tube plate 43 and in the portion within the enclosure provides a means for flow of natural gas into the refrigeration section of the rectifier.

It will be seen that, dependent upon the manner in which radial flow passages 36, 37 and radial flow passages 38, 39 are connected to a source of refrigerating fluid and a means for discharging the refrigerating fluid, respectively, the refrigerating fluid in heat transfer relationship with the natural gas flowing around outer heat exchanger tubes 24 will be flowing either upwardly or downwardly. For example, if radial flow passages 38, 39 are connected to a source of refrigerating fluid, as by an inlet pipe 52 passing through outer shell 11, and if radial flow passages 36, 37 are connected to a means for discharging the refrigerating fluid, as by a discharge pipe 53 passing through outer shell 11, chambers 47, 48 become intake headers and chambers 40, 41 become discharge headers. Refrigerating fluid is pumped through radial flow passages 38, 39 into chambers 47, 48 and upwardly through inner heat exchanger tubes 33. The refrigerating fluid passes out of the top of the inner tubes and flows downwardly between the spaced-apart fins in the annular space between the inner and outer heat exchanger tubes. As it passes downwardly between the spaced-apart fins, turbulence is created by wire 32 between each pair of fins, thereby markedly improving heat transfer through the walls of tubes 24. The fluid passes from the lower ends of the outer tubes into chambers 40, 41 and is discharged through radial flow passages 36, 37.

It will be further seen that by reversing the connections for intake and discharge of refrigerating fluid, chambers 40, 41 become intake headers so that refrigerating fluid flows upwardly between the spaced-apart fins in the annular space between the inner and outer heat exchanger tubes and then downwardly within the inner heat exchanger tubes into discharge headers 47, 48.

The pre-cooling section of the rectifier is bounded at its upper longitudinal end by the gas distribution header and at its lower end by a tube sheet 54. The periphery of the tube sheet is joined to the inner wall of the shell thereby sealing this section from the lower sections of the rectifier. A liquid downcomer 55 is disposed coaxially with, and centrally within, the shell. At its upper end, the liquid downcomer passes through the gas distribution header and terminates on the upper side of the header. The liquid downcomer centrally passes through the tube sheet, a fluid-tight seal being formed between the outer wall of the downcomer and the tube sheet.

Nine heat exchanger tubes 56 are arcuately spaced in the annular space within the pre-cooling section formed between the liquid downcomer and the inner wall of the shell and provide a first heat exchanging means. The upper end of each tube is joined to the bottom side of the gas distribution header so as to connect the interior of the header with the interior of the tube. The lower end of each tube passes through the tube sheet and terminates on the bottom side of the tube sheet. A fluid-tight seal is formed between the exterior of each tube and the tube sheet. Between the gas distribution header and the tube sheet, the tubes pass through a baffle plate 57. The baffle plate is located slightly above a feed gas inlet pipe 58 and acts to distribute the incoming feed gas throughout the annular space of the pre-cooling section.

As particularly shown in FIG. 5, the heat exchanger tubes pass through holes in the baffle plate, the holes being slightly larger in diameter than the outside diameter of the tubes. The feed gas passes through these annular spaces between the tubes and the baffle plate since the baffle plate is sealed at its outer diameter to the inner wall of the shell and at its inner diameter to the outer wall of the liquid downcomer. The flow area may be increased by providing an annular opening between the baffle plate and the shell. The flow area required may be easily calculated as a function of the feed gas throughput.

Aluminum tubes, each having external and internal fins, are used to provide optimum heat transfer. However, the internal fins are reamed from the tubes for a short distance above and below the point where the tubes pass through the baffle plate. This is done to prevent excessive cooling of the feed gas in the vicinity of the baffle plate and thereby to avoid gas hydrate formation at that point.

A liquid level pipe 59 is fitted through the shell at a point slightly above the tube sheet and below the feed gas inlet pipe. It externally connects the lower portion of the pre-cooling section and the liquid collecting section of the rectifier and maintains a constant liquid level within the former section.

The gas outlet section of the rectifier is bounded at the upper longitudinal end by the tube sheet and at the lower longitudinal end by a support plate 60. The periphery of the support plate is joined to the inner wall of the shell thereby sealing this section from the liquid collecting section below. The liquid downcomer passes centrally through the support plate and terminates on its bottom side. A gas outlet pipe 61 passes through the shell and connects the gas outlet section with an external dry gas storage or transmission facilities. As previously described, the bottom ends of the heat exchanger tubes terminate on the bottom side of the tube sheet so that any fluid flowing downwardly through the heat exchanger tubes is discharged into the gas outlet section.

The liquid collecting section is bounded at the upper longitudinal end by the support plate and at the lower longitudinal end by the lower internal cap. As previously described, the liquid downcomer passes centrally through the support plate so that liquid condensate drains into the liquid collecting section. For convenience, a drain pipe 62, having a smaller diameter than the downcomer, depends into the section. The liquid level pipe permits any liquids condensed within the pre-cooling section to drain into the liquid collecting section. A liquid outlet pipe 63 is fitted through the shell near the bottom of the liquid collecting section. A level control valve 64 is also provided in this section.

The operation of the refrigerating rectifier in the treatment of wet natural gas and the effectiveness of the refrigeration unit of the invention will be understood by tracing the flow of wet natural gas through the embodiment of the rectifier previously described. For convenience of description, the treatment of the gas and the liquid condensation products, both water and hydrocarbons, will be separately considered even though such treatment occurs simultaneously during flow through the rectifier.

The wet gas enters the pre-cooling section of the rectifier and is distributed uniformly throughout the annular space of that section by the baffle plate. The gas flows upwardly around the heat exchanger tubes, then through the annular space between the gas distribution header and the inner wall of the shell. The gas passes through flow passages 51 in the central plate of the refrigeration unit and is cooled by indirect heat transfer with refrigerating fluid as it passes exteriorly of outer tubes 24 of the refrigeration unit of the present invention. At the top of the refrigeration section, the gas has been cooled and dehydrated to the maximum extent reached during the treatment. The gas then flows successively downwardly through the gas downcomer, and, after being distributed in the gas distribution header, through the heat exchanger tubes into the gas outlet section. From the gas outlet section, it passes through the gas outlet pipe of the rectifier to storage or gas transmission facilities.

Within the pre-cooling section, once the rectifier has been placed on stream, wet gas is flowing upwardly on the outside of the heat exchanger tubes and is being cooled by cold gas flowing downwardly on the inside of the tubes. The design is such that the hydrate temperature is not reached until after the gas passes through the holes of the baffle plate. In this manner, gas hydrate formation does not block the flow channels through the baffle plate but occurs upwardly of the baffle plate where no substantial interference with flow results.

As a result of the pre-cooling, approximately 90% of the water within the gas is condensed in the pre-cooling section. It has been found that approximately 80% of the water condensed in the pre-cooling section is drained off while the remaining 20% clings to the tubes as a hydrate. In addition, of the hydrocarbon constituents of the natural gas removed during the treatment of the wet gas, approximately the following percentages are condensed in the pre-cooling section: 90% of the heptanes and heavier, 70% of the hexane, 40% of the pentanes, 20% of the butanes and 10% of the propane.

The pre-cooled gas then flows around the outer tubes of the refrigerating unit. The remainder of the condensable hydrocarbons are removed from the gas in this section. At the top of the refrigerating section, approximately 95% of the water initially present in the gas has been removed by the treatment. This concentration of water is well within the limits acceptable for transmission of the gas in pipelines. The cold dry gas then passes into the gas downcomer and, in flowing downwardly, acts to pre-cool the incoming wet feed gas in the manner previously described. The water content remains constant since the gas is superheated with respect to its remaining water.

Liquid condensation occurs in both the pre-cooling section and the refrigerating section. In the pre-cooling section, the condensed hydrocarbon constituents and water are collected on the top of the tube sheet and overflow into the liquid collecting section through the liquid level pipe. The hydrocarbon constituents are condensed throughout the length of the pre-cooling section and flow downwardly counter to the upflowing warm wet feed gas. As a result, a continuous process of fractionation and stripping occurs by which the high vapor-pressure components are stripped from the hydrocarbon condensate.

The hydrocarbon constituents condensed in the refrigerating section are collected on the upper surface of the gas distribution header. The small amount of water condensed in this section clings to the outer tubes as a hydrate. The hydrocarbon liquid flows downwardly by gravity through the liquid downcomer into the liquid collecting section. The downflowing liquid flows as a film along the inner wall of the downcomer, thereby promoting maximum heat transfer efficiency. Since the liquid downcomer is externally surrounded by the upflowing warm feed gas, a heat exchange occurs through the wall of the downcomer between the gas and the film of condensed liquids. In this manner, high vapor pressure components are removed from the downflowing hydrocarbon condensate while the upflowing feed gas is simultaneously cooled.

For further stabilization of the hydrocarbon condensate, the liquid products can be passed from the liquid collecting section through the liquid outlet pipe into the top of a stabilizing column (not shown).

An example of the use of the refrigerating unit of the present invention in the rectifier described above will serve to demonstrate its advantages. A wet natural gas entered the rectifier through the feed gas inlet pipe at a rate of 4,000,000 cubic feet per day and a pressure of 400 p.s.i.g. After passing through the pre-cooling section, the temperature of the gas entering the refrigerating section was 42° F. After passing through the refrigerating unit of the present invention, the temperature of the gas was 24° F.

In this example, the refrigerating unit included eight outer tubes, 20 feet in length. Each outer tube had 32 outer fins and 14 inner fins. Wires to promote turbulence of the refrigerating fluid were placed in the slots between the fins of the outer heat exchanger tubes. The flow of refrigerating fluid within the refrigerating unit was upward in the annular space between the inner and outer heat exchanger tubes. The temperature of the refrigerating fluid entering the unit was 2° F. and the temperature of the refrigerating fluid leaving the unit was 5° F. The over-all heat transfer factor, based on the total outer heat transfer surface, was 8.0 B.t.u./hr./sq. ft./° F.

Results substantially the same as described above were obtained where the flow of refrigerating fluid within the refrigerating unit was reversed so that it was downward in the annular space between the inner and outer heat exchanger tubes.

Under the conditions of natural gas flow described in the foregoing, the use of conventional refrigerating coils in the refrigerating section resulted in a gas temperature of 34° F. after the natural gas had passed through the refrigerating section. This improvement in cooling of the natural gas at the same refrigerating capacity is achieved because of the more effective heat transfer produced in the refrigerating unit of the present invention. Not only does its structure provide a maximum heat transfer surface within a given restricted space but the negligible pressure drop in the flow of refrigerating fluid within the unit acts to increase the cooling capacity. The only energy loss in transporting the fluid is that resulting in lifting the fluid to the point where it flows downwardly either within the annular space or within the inner tubes.

It will be understood that modifications may be made in the refrigerating unit of the present invention as described herein without departing from the scope of the invention. For example, while the unit has been described wherein each of the two intake headers and each of the two discharge headers separately accommodate half of the heat exchanger tubes, the refrigerating unit is not limited to this arrangement. It can, for example, be advantageously adapted wherein each intake heat exchanger tube is separately connected to the source of refrigerating fluid so that the proper proportion of two-phase refrigerant is passed directly to an individual tube from the refrigeration expansion valve. Similarly, dependent upon the total number of heat exchanger tubes in the refrigerating unit, other modifications may be made with respect to the number of chambers as intake headers and discharge headers and as to the number of tubes adapted to each.

As indicated in connection with the description of the treatment of a wet gas, gas hydrate formation occurs during the process of treatment. The hydrates formed cling to the heat exchanger tubes and the outer tubes of the refrigerating unit, thereby decreasing the efficiency of heat transfer. To "defrost" these heat exchange surfaces, the refrigeration equipment used in conjunction with the refrigerating unit of the invention can be adapted so that it acts as a heat pump for certain intervals during the treating process. Through an automatically-timed cycle, hot gaseous refrigerant can be pumped through the heat exchanger tubes of the refrigeration unit for a short period of time during each twelve or twenty-four hour period of operation. In this manner, without interruption of wet gas flow, the heat exchange surfaces are kept free of excessive build-up of gas hydrates.

The economy and effectiveness of the refrigerating rectifier described in my copending application are markedly enhanced by the use of the refrigerating unit of the present invention as the second heat exchanging means. In addition, it acts to increase the throughput capacity of the rectifier.

I claim:

1. Apparatus for treating natural gas to remove condensable components comprising an elongated vertical shell including at least two tubular sections joined together at flanged ends to form a fluid-tight enclosure; a feed gas inlet for admitting feed gas to the enclosure; tubular heat exchanging means within the enclosure; a refrigerating unit within the enclosure above the heat exchanging means and including a first plurality of vertically disposed outer heat exchanger tubes, a second equal plurality of inner heat exchanger tubes, each of the inner tubes being concentrically disposed within an outer tube, means closing one end of the outer tubes, the end of the inner tubes adjacent thereto being open, a refrigerating fluid distribution header adapted whereby an outer annular portion is sealably supported between the flanged ends of the two tubular sections of the shell and including an intake chamber with which the other end of one plurality of tubes is in flow communication, a discharge chamber with which the other end of the other plurality of tubes is in flow communication, said other ends being sealed from each other, means connecting the intake chamber and a source of refrigerating fluid, and means connected to the chamber of the discharge header for removing refrigerating fluid; means for directing feed gas upwardly across the exteriors of the heat exchanging means and the refrigerating unit successively; means adapted for transmitting gas passing across the refrigerating unit into the interior of one end of the heat exchanging means; a gas outlet in flow communication with the interior of the other end of the first heat exchanging means; and a liquid outlet in the lower part of the enclosure.

2. Apparatus in accordance with claim 1 wherein the chamber of the intake header is in flow communication with the other end of the inner heat exchanger tubes and the chamber of the discharge header is in flow communication with the other end of the outer heat exchanger tubes.

3. Apparatus in accordance with claim 1 wherein a plurality of longitudinal fins extend inwardly from the inner wall of each outer tube to define a plurality of flow spaces.

4. Apparatus in accordance with claim 3 wherein means for promoting turbulence in flow of refrigerating fluid are disposed in each of the flow spaces in each of the outer tubes.

5. In a rectifier for treating natural gas to remove condensable components, the rectifier having an elongated vertical shell including at least two tubular sections joined together at flanged ends to form a fluid-tight enclosure, a refrigerating unit comprising a first plurality of vertically disposed outer heat exchanger tubes, a second plurality of inner heat exchanger tubes, each of the inner tubes being concentrically disposed within an outer tube, means closing one end of the outer tubes, the end of the inner tubes adjacent thereto being open, a refrigerating fluid distribution header having an outer annular portion sealably supported between the flanged ends of the two tubular sections of the shell and including both an intake chamber with which the other end of one plurality of tubes is in flow communication and a discharge chamber with which the other end of the other plurality of tubes is in flow communication, said other ends being sealed from each other, means connecting the intake chamber and a source of refrigerating fluid, and means connected to the discharge chamber for removing refrigerating fluid.

References Cited in the file of this patent

UNITED STATES PATENTS

| 163,482 | Guild | May 18, 1875 |
| 2,134,058 | Ris | Oct. 25, 1938 |
| 2,492,932 | Fausek et al. | Dec. 27, 1949 |
| 2,804,292 | Schilling | Aug. 27, 1957 |
| 2,900,798 | Jonkers | Aug. 25, 1959 |
| 2,964,915 | Hull | Dec. 20, 1960 |